United States Patent [19]

McGarry et al.

[11] Patent Number: 4,992,396

[45] Date of Patent: Feb. 12, 1991

[54] FUSED AZS REFRACTORY COMPOSITION

[75] Inventors: Charles N. McGarry, Clarksville; Thomas M. Wehrenberg, Jeffersonville, both of Ind.; Douglas A. Drake; Gary L. Lawson, both of Louisville, Ky.

[73] Assignee: Corhart Refractories Corporation, Louisville, Ky.

[21] Appl. No.: 395,285

[22] Filed: Aug. 15, 1989

Related U.S. Application Data

[63] Continuation of Ser. No. 133,537, Dec. 16, 1987, abandoned.

[51] Int. Cl.$^5$ .................. C04B 35/48; C04B 35/62
[52] U.S. Cl. ..................................... 501/107; 501/105; 501/106; 501/128
[58] Field of Search ............... 501/105, 106, 107, 128; 264/63

[56] References Cited

U.S. PATENT DOCUMENTS

| | | | |
|---|---|---|---|
| 3,249,449 | 5/1966 | Kiehl et al. | 501/107 X |
| 3,437,499 | 4/1969 | Horak et al. | 501/107 R |
| 3,754,950 | 8/1973 | Cevales | 501/105 R |
| 3,972,722 | 8/1976 | Holt et al. | 501/105 R |
| 4,053,321 | 10/1977 | Okumiya et al. | 501/105 R |
| 4,119,472 | 10/1978 | Brashear et al. | 501/105 R |
| 4,244,745 | 1/1981 | Havranek et al. | 501/124 |
| 4,308,067 | 12/1981 | Guigonis et al. | 501/105 |
| 4,591,383 | 5/1986 | McGarry et al. | |

FOREIGN PATENT DOCUMENTS

| | | | |
|---|---|---|---|
| 0021936 | 1/1981 | European Pat. Off. | 501/107 |
| 0620462 | 8/1978 | U.S.S.R. | 501/107 |
| 0668924 | 6/1979 | U.S.S.R. | 501/107 |

OTHER PUBLICATIONS

Maczura et al., G., "Special Aluminas for Ceramics and Other Industrial Applications", *Interceram*, No. 3, 1976.

*Primary Examiner*—Karl Group
*Attorney, Agent, or Firm*—Panitch Schwarze Jacobs & Nadel

[57] ABSTRACT

Fused AZS grain refractory compositions suitable for making ceramically or chemically bonded refractory articles, and the articles so made, are disclosed. The refractory compositions consist essentially of (a) 40–85 wt. % fused AZS grain, and (b) 15–50 wt. % of at least one constituent selected from the group consisting of (i) 10–20 wt. % reactive alumina and (ii) 0–45 wt. % chromic oxide.

28 Claims, No Drawings

FUSED AZS REFRACTORY COMPOSITION

This is a continuation of U.S. patent application Ser. No. 07/133,537 filed Dec. 16, 1987, now abandoned.

BACKGROUND OF THE INVENTION

This invention relates to fused AZS grain refractory compositions suitable for making ceramically or chemically bonded refractory articles and to the articles so made.

The general concept of rebonding crushed fused AZS grain is well known in the art. Numerous compositions containing crushed fused AZS and other materials have been developed for various end uses. See, for example, U.S. Pat. No. 4,119,472 and the patents cited therein.

The composition disclosed in U.S. Pat. No. 4,119,472 disclosed as being characterized by superior resistance to corrosion by molten glass and alkali in contact therewith and by superior flexure strength at room temperature before and, in many cases, after substantial thermal cycling. The composition of U.S. Pat. No. 4,119,472, in its broadest aspect, consisted of (A) 25-60 wt. % fusion cast AZS refractory coarse grain, (B) 0-38 wt. % fusion cast AZS refractory medium grain, and (C) 30-50 wt. % of at least one component selected from the group consisting of (1) 0-50 wt. % fusion cast AZS refractory fine grain, and (2) 0-30 wt. % at least one constituent selected from the group consisting of (a) alumina being at least 90 wt. % $-325$ Tyler mesh, at least 98.5 wt. % $Al_2O_3$ and not more than 0.5 wt. % $Na_2O$, and (b) $-325$ Tyler mesh chromic oxide being at least 95 wt. % $Cr_2O_3$. The refractory composition of U.S. Pat. No. 4,119,472 does not utilize reactive alumina. Despite the improved properties provided by the refractory compositions of U.S. Pat. No. 4,119,472, the need exists for a refractory composition which has higher corrosion resistance to glass and which will have a longer life in glass melting furnaces. This has been accomplished with the refractory compositions of this invention by improving the bonding matrix. Articles made from the refractory compositions of this invention are superior to articles made from prior art compositions in that they have high glass corrosion resistance and still maintain advantageous properties such as thermal cycling capability.

SUMMARY OF THE INVENTION

This invention relates to refractory compositions suitable for making ceramically or chemically bonded refractory articles and to the articles so made. The refractory articles of this invention are characterized by high corrosion resistance and the ability to withstand rapid thermal cycling.

In their broadest aspect, the refractory compositions of this invention consist essentially of
(a) 40-85 wt. % fused AZS grain;
(b) 15-50 wt. % of at least one constituent selected from the group consisting of
  (i) 10-20 wt. % reactive alumina; and
  (ii) 0-45 wt. % chromic oxide.

DETAILED DESCRIPTION OF THE INVENTION

The fused AZS refractory of the grains in the refractory compositions of this invention has a three-phase microstructure of interlocking crystals of corundum (alpha alumina) phase and baddeleyite (zirconia) phase with intercrystalline glassy phase therebetween. The glass phase is about 15-30 (preferably 20-30) volume % of the fused AZS refractory. The AZS refractory preferably has an oxide analysis consisting of 32-42 wt. % $ZrO_2$, 12-16.5 wt. % $SiO_2$, 45-50 wt. % $Al_2O_3$, 1-3 wt. % $Na_2O$ and up to 7 wt. % other ingredients. The other ingredients can include, for example, $Fe_2O_3$, $TiO_2$, CaO, $K_2O$, $B_2O_3$ and MgO. The AZS is crushed and preferably sized to $-4$ Tyler mesh to comprise a mixture of coarse grain and medium grain.

Reactive alumina comprises about 10-20 wt. %, preferably about 13-17 wt. %, of the refractory composition of this invention. As is well known in the art, reactive alumina is composed of fine sintered corundum crystals. Their high surface area and small crystal size makes them thermally reactive. The average particle size of the reactive alumina can vary between 4 and 0.5 microns; best results have been achieved to date using alumina with an average particle size of about 1.5 microns.

The chromic oxide which comprises 0-45 wt. % of the refractory composition of this invention is preferably pigment grade. However, lesser purity chromic oxide (e.g. metallurgical grade) may also be used.

To prepare articles from the refractory compositions of this invention, the mixture of AZS grain, reactive alumina and chromic oxide may be ceramically bonded, i.e., combined with appropriate organic binders and lubricants (e.g., lignin sulfonate, polyethylene glycol, waxes, etc.) formed into shapes and fired to high temperatures (e.g., approximately 2730° F. or above). Alternatively, excellent performance has been obtained by chemically bonding the materials, e.g., by mixing the materials with approximately 4 to 6 wt. %, preferably about 5 wt. %, based on the total weight of AZS plus reactive alumina plus chromic oxide, of monoaluminum or monochromium phosphate solutions, forming into shapes and curing at relatively low temperatures (e.g., 285° F. to 1500° F.). It is preferred to use a monoaluminum phosphate solution which is a 40-60% aqueous solution having an $Al_2O_3$ content of about 4.5-10.0% and a $P_2O_5$ content of about 23-50%. The articles may be successfully formed on vibration presses, mechanical presses and isostatic presses, as well as by using other known presses and forming methods.

One application for the refractory compositions of this invention should be in the glass industry for use in sidewalls, paving, overcoating, ports, stacks and regenerators. They are particularly useful in electric furnace (cold crown type melters), sidewalls and orifice assembly protection blocks where exceptional thermal shock characteristics and resistance to high alkali glass (wool fiberglass) is required or in other applications where resistance to hot corrosive slags is needed. The compositions of this invention not containing chromic oxide are additionally useful for application in the glass industry in less severe glass contact and non-glass contact areas where high alkali attack resistance is required and where chromic oxide cannot be tolerated due to coloration of the glass.

The following examples are presented to further illustrate this invention. These examples are illustrative only and are not intended to limit in any way the scope of this invention.

The data presented in the following examples were obtained using the following test procedures:

Modulus of Rupture (MOR) - ASTM C-133

Bulk Density - ASTM C-20-74

Apparent Porosity (App. Por.) - ASTM C-20-74 Modified

Thermal Shock Cycles - Determined by cycling 1"×1"×3" specimens in and out of a 1400° C. gas fired furnace on 15 minute cycles, i.e., 15 minutes in and 15 minutes out, until at least 5% of the weight of the sample is lost by cracking or thermal spalling Wool Glass Corrosion - 1 cm× 1 cm× 5 cm bar heated to 1450° C. in wool glass for 3 days per ASTM C-621 procedure.

Soda Lime Glass Corrosion - 1 cm × 1 cm × 5 cm bar heated to 1400° C. in soda lime glass for 3 days per ASTM C-621 procedure The AZS grain used in the examples had a chemical composition in the range of: 32-42 wt. % $ZrO_2$, 12-16.5 wt. % $SiO_2$, 45-50 wt. % $Al_2O_3$, 1-3 wt. % $Na_2O$, 7% Max. other.

A continuous distribution AZS grain used in the examples comprised both coarse and intermediate grain and had a particle size distribution as follows:

| Continuous Distribution AZS Grain | |
| --- | --- |
| Tyler Mesh No. | Cum. Wt. % on Screen Range |
| 4 | .1 |
| 6 | .3-15.3 |
| 8 | 20.0-34.4 |
| 10 | 35.8-50.7 |
| 12 | 53.9-58.9 |
| 14 | 58.8-65.3 |
| 20 | 66.8-73.8 |
| 28 | 72.8-79.4 |
| 35 | 76.7-83.5 |
| −35 | 16.5-23.3 |

Other AZS grain that can alternatively be used in the examples had gap sized particle size distributions as follows:

| 6 × 10 AZS - Coarse Grains | |
| --- | --- |
| Tyler Mesh No. | Cum. Wt. % on Screen Range |
| 4 | Trace |
| 6 | 0-3 |
| 8 | 30-55 |
| 10 | 55-75 |
| 12 | 75-90 |
| 20 | 96-100 |
| −20 | 0-4 |

| −10 AZS - Intermediate Grains | | |
| --- | --- | --- |
| Tyler Mesh No. | Cum. Wt. % on Screen Range | |
| | Min. | Max. |
| 6 | Trace | |
| 8 | Trace | |
| 10 | .2 | .8 |
| 12 | .5 | 10 |
| 20 | 18 | 48 |
| 28 | 31 | 64 |
| 35 | 41 | 75 |
| 48 | 53 | 83 |
| 100 | 67 | 91 |
| 200 | 78 | 95 |
| −200 | 5 | 22 |

The reactive alumina utilized in the examples has an average particle size and average ultimate crystal size of 1.5 microns and has the following typical chemical composition;

| Chemistry | Wt. % |
| --- | --- |
| $Al_2O_3$ | 99.7 |
| $Na_2O$ | .08 |
| $Fe_2O_3$ | .02 |
| CaO | .02 |
| $B_2O_3$ | .01 |
| MgO | .00 |
| Other | .17 |

Alumina referred to in the examples as "Cal-325 M" is calcined alumina, −325 mesh, and that referred to as "Tab-325M" is tabular alumina, −325 mesh.

The chromic oxide utilized in the examples was pigment grade (98% $Cr_2O_3$) with an average particle size, based on sedigraph analysis, of 2-6 microns.

The compositions described in the examples were mixed in a Simpson mixer to evenly distribute the various dry ingredients. Following this, organic binders were added to the compositions, the compositions were pressed into articles and fired to above 2730° F. Alternatively, in the phosphate bonded compositions, liquid phosphate solutions were added in place of organic binders to provide green strength and act as binders until the pressed articles were cured at low temperatures (285°-1500° F.).

EXAMPLE 1

Ceramic bonded chromic oxide refractory compositions according to this invention were made, mixed with organic binders (ligno sulfonate 3.5-4.5 wt. % and polyethylene glycol solution 1%, prepared by dissolving 20,000 molecular weight polyethylene glycol in water at a concentration of 20 % by weight), pressed and fired at above 2730° F. Comparable compositions, but not using reactive alumina, were also prepared and processed in the same manner (Comparative Examples A, B and C). Details of these compositions and their physical properties are presented in Table 1.

TABLE 1

| | 1 | A | B | C |
| --- | --- | --- | --- | --- |
| AZS GRAIN | | | | |
| 6 × 10 mesh, % | 40.0 | 40.0 | 40.0 | 40.0 |
| −10 mesh, % | 15.0 | 30.0 | 15.0 | 15.0 |
| ALUMINA | | | | |
| Cal-325 M, % | | 15.0 | 15.0 | |
| Tab-325 M, % | | | | 15.0 |
| Reactive, % | 15.0 | | | |
| CHROMIC OXIDE, % | 30.0 | 15.0 | 30.0 | 30.0 |
| ORGANIC BINDER, % | 5.5 | 5.0 | 4.5 | 5.5 |
| PHYSICAL PROPERTIES | | | | |
| App. Por. % | 17.5 | 16.2 | 20.5 | 18.3 |
| Bulk Density, gm/cc | 3.33 | 3.01 | 3.22 | 3.28 |

TABLE 1-continued

|  | 1 | A | B | C |
|---|---|---|---|---|
| Bulk Density, lb/ft | 208 | 188 | 201 | 205 |
| MOR, Ambient PSI | 4400 | 4900 | 4400 | 4700 |
| Thermal Shock, Cycles 1400° C. to Ambient | 20+ | 20+ | 16¾ | 16¾ |
| Wool Glass Corrosion, Metal Line Cut, mm | .83 | 1.485 | .83 | .86 |

The compositions of Example 1 and Comparative Examples B and C all have superior glass corrosion resistance to that of Comparative Example A. The composition of Example 1, however, is superior to the other compositions since its tendency to produce stones (refractory particles) in glass melting applications is substantially less than that of the other compositions. Also, the composition of Example 1 exhibits lower dimensional change during firing than the other compositions, making it easier to manufacture.

EXAMPLES 2-7

Refractory compositions according to this invention were made, mixed with liquid phosphate solutions and cured at low temperatures (Examples 2-7). Comparable compositions, but not using reactive alumina, were also prepared and processed in the same manner (Comparative Examples D, E, F, and G). Details of these compositions and their physical properties are presented in Table 2.

TABLE 2

|  | 2 | 3 | 4 | D | E |
|---|---|---|---|---|---|
| AZS*, % | 55.0 | 55.0 | 55.0 | 55.0 | 55.0 |
| ALUMINA |  |  |  |  |  |
| Cal-325 M, % |  |  |  | 15.0 |  |
| Tab-325M, % |  |  |  |  | 15.0 |
| Reactive, % | 15.0 | 15.0 | 15.0 |  |  |
| CHROMIC OXIDE PHOSPHATE SOL'N | 30.0 | 30.0 | 30.0 | 30.0 | 30.0 |
| Monoaluminum phosphate** | 5.0 | 5.0 | 6.0 | 5.0 | 5.0 |
| CURING TEMP., °F. | 285 | 1500 | 1500 | 1500 | 1500 |
| PHYSICAL PROPERTIES |  |  |  |  |  |
| App. Por. % | 17.8 | 16.1 | 17.1 | 15.6 | 15.3 |
| Bulk Density, gm/cc | 3.44 | 3.43 | 3.41 | 3.39 | 3.44 |
| Bulk Density, lb/ft | 215 | 214 | 213 | 212 | 215 |
| MOR, Ambient, PSI | 2700 | 5500 | 4300 | 6400 | 6000 |
| Wool Glass Corrosion, Metal Line Cut, mm | .80 | .68 | .69 | .94 | .76 |

|  | 5 | 6 | 7 | F | G |
|---|---|---|---|---|---|
| Azs*, % | 55.0 | 55.0 | 55.0 | 70.0 | 55.0 |
| ALUMINA |  |  |  |  |  |
| Tab-325M, % |  |  |  |  | 15.0 |
| Reactive, % | 15.0 | 15.0 | 15.0 |  |  |
| CHROMIC OXIDE PHOSPHATE SOL'N | 30.0 | 30.0 | 30.0 | 30.0 | 30.0 |
| Monochromium Phosphate*** | 5.0 | 5.0 | 5.0 | 4.5 | 5.0 |
| CURING TEMP., °F. | 1500 | 285 | 580 | 580 | 1500 |
| PHYSICAL PROPERTIES |  |  |  |  |  |
| App. Por. % | 17.0 | 14.8 | 17.8 | 16.4 | 16.9 |
| Bulk Density, gm/cc | 3.39 | 3.48 | 3.41 | 3.48 | 3.41 |
| Bulk Density, lb/ft | 212 | 217 | 213 | 217 | 213 |
| MOR, Ambient, PSI | 4300 | 2900 | 2700 | 1800 | 4500 |
| Wool Glass Corrosion, Metal Line Cut, mm | .76 | .775 | .64 | .84 | .685 |

*Continuous Distribution AZS grain as described above
**50% aqueous solution, 8.0% Al₂O₃ and 32% P₂O₅
***50% aqueous solution, 9% Cr₂O₃, 32% P2O5

The data in Table demonstrate that phosphate bonding techniques known in the art may be used with these compositions and produce a refractory body that demonstrates comparable physical properties and better glass corrosion resistance than similar ceramically bonded bodies that were presented in Table 1. Field test performance to date demonstrates similar results for these phosphate bonded compositions.

EXAMPLES 8 and 9

As examples of refractory compositions according to this invention containing no chromic oxide, the compositions of Examples 8 and 9, detailed in Table 3, were prepared. The compositions of Examples 8 and Comparative Example H were mixed with organic binders, pressed and fired at above 2885° F. The composition of Example 9 was phosphate bonded, pressed and fired at 285° F. The properties of the resulting refractories are presented in Table 3.

TABLE 3

|  | 8 | H | 9 |
|---|---|---|---|
| AZS GRAIN | | | |
| 6 × 10 mesh, % | 27.5 | 27.5 | 27.5 |
| −10 mesh, % | 57.5 | 57.5 | 57.5 |
| ALUMINA | | | |
| Cal-325 M, % |  | 15.0 |  |
| Reactive, % | 15.0 |  | 15.0 |
| ORGANIC BINDER, % | 5.0 | 5.0 |  |
| MONOALUMINUM PHOSPHATE* |  |  | 4.5 |
| CURING TEMPERATURE, °F. | 2885 | 2885 | 285 |
| PHYSICAL PROPERTIES | | | |
| App. Por., % | 8.4 | 16.7 | 15.2 |
| Bulk Density, gm/cc | 3.23 | 3.11 | 3.27 |
| Bulk Density, lb/ft | 202 | 194 | 204 |
| Soda Lime Glass Corrosion, Metal Line Cut, mm | .49 | .68 | .51 |

*Same as in Table 2

The data in Table 3 indicate that the composition according to this invention containing reactive alumina and without chromic oxide is substantially superior to the composition containing −325 mesh calcined low soda alumina in soda lime glass corrosion resistance.

What is claimed is:

1. Refractory composition for making refractory articles consisting essentially of:
   (a) 40-85 wt. % fused AZS grain;
   (b) 10-20 wt. % reactive alumina having an average particle size of about four to one-half micron;
   (c) 0-45 wt. % chromic oxide; and
   (d) a binding composition selected from the group consisting essentially of alumina phosphate, organic binders and lubricants, the binding composition being combined with one hundred weight percent of components (a), (b) and (c).

2. The composition of claim 1 where said AZS grain has an oxide analysis of 32-42 wt. % $ZrO_2$, 12-16.5 wt. % $SiO_2$, 45-49.5 Wt. % $Al_2O$, 1-3 wt. % $Na_2O$ and up to 7 wt. % other ingredients.

3. The composition of claim 1 where said AZS has a continuous or gap sized particle size distribution.

4. The composition of claim 1 which contains about 13-17 wt. % reactive alumina.

5. The composition of claim 1 in which said chromic oxide is pigment grade.

6. The composition of claim 1 which contains 0 wt. % chromic oxide.

7. The composition of claim 4 which contains 0 wt. % chromic oxide.

8. The composition of claim 1 in which said fused AZS grain is at least 99 wt % −4 Tyler mesh.

9. A method of preparing a shaped, bonded refractory object comprising the steps of:
   blending together a binding composition selected from the group consisting essentially of aluminum phosphate, organic binders and lubricants, and components of a refractory composition consisting essentially of:
   (a) 40-85 wt. % fused AZS grain,
   (b) 10-20 wt. % reactive alumina having an average particle size of about four to one-half micron, and
   (c) 0-45 wt. % chromic oxide;
   forming the blended refractory composition into shaped objects; and
   curing the shaped objects at a temperature above 140° C. to bond the composition.

10. The method of claim 9 wherein the binding composition organic and the shaped object is heated to a temperature of about 1500° C. or more to ceramically bond the composition.

11. The method of claim 9 wherein the binder consists essentially of a liquid aluminum phosphate solution and wherein the shaped object is heated to a temperature between about 140° C. and 815° C. to chemically bond the composition.

12. The method of claim 11 wherein the binder is between about 4 to 6 wt. %, based on total weight of AZS plus reactive alumina plus chromic oxide, of monoaluminum phosphate solution.

13. A shaped, chemically bonded refractory object prepared by the method of claim 12.

14. A shaped, ceramically bonded refractory object prepared by the method of claim 10.

15. The ceramically bonded object of claim 14 in which said AZS grain has an oxide analysis of 32-42 wt. % $ZrO_2$, 12-16.5 wt. % $SiO_2$, 45-50 wt. % $Al_2O$, 1-3 wt. % $Na_2O$ and up to 7 wt. % other ingredients.

16. The ceramically bonded object of claim 14 which contains about 13-17 wt. % reactive alumina.

17. The ceramically bonded object of claim 14 in which said chromic oxide is pigment grade.

18. The ceramically bonded object of claim 14 which contains 0 wt. % chromic oxide.

19. A shaped, chemically bonded refractory object prepared by the method of claim 11.

20. The chemically bonded object of claim 19 where said AZS grain has an oxide analysis of 32-42 wt. % $ZrO_2$, 12-16.5 wt. % $SiO_2$, 45-50 wt. % $Al_2O$, 1-3 wt. % $Na_2O$ and up to 7 wt. % other ingredients.

21. The chemically bonded object of claim 19 which contains about 13-17 wt. % reactive alumina.

22. The chemically bonded object of claim 19 in which said chromic oxide is pigment grade.

23. The chemically bonded object of claim 19 which contains 0 wt. % chromic oxide.

24. In a glass melting furnace constructed of shaped, refractory elements, the improvement wherein at least one of the shaped elements is formed from a refractory composition consisting essentially of:
   (a) 40-85 wt. % fused AZS grain;
   (b) 10-20 wt. % reactive alumina having an average particle size of about four to one-half micron;
   (c) 0-45 wt. % chromic oxide; and
   (d) a binding composition selected from the group consisting essentially of aluminum phosphate, organic binders and lubricants, the binding composition being combined with one hundred weight percent of components (a), (b) and (c).

25. The improvement of claim 24 wherein the furnace has an interior containing heated contents of the furnace and wherein the one element is exposed on the interior for direct contact with the heated contents of the furnace.

26. The improvement of claim 25 wherein the one elements is located for direct contact with molten glass in the furnace.

27. The improvement of claim 26 in combination with molten wool glass in the furnace contacting the one element.

28. The improvement of claim 24 in combination with molten wool glass in the furnace.

* * * * *